COLOR TELEVISION SYSTEM

Filed Nov. 28, 1947

INVENTOR.
George C. Sziklai
BY
[signature]
ATTORNEY

Patented Sept. 4, 1951

2,566,707

UNITED STATES PATENT OFFICE 2,566,707

COLOR TELEVISION SYSTEM

George C. Sziklai, Princeton, N. J., assignor to Radio Corporation of America, a corporation of Delaware Application November 28, 1947, Serial No. 788,746

6 Claims. (Cl. 178—5.4)

This invention relates to methods and arrangements for the transmission of information relating to the color of objects being televised.

The transmission of images by television is now almost universally accomplished by a scanning process which divides an image into its image elements and transmits electrical representations of the image elements in rapid sequence to develop at a remote location an image of the object being scanned.

Two basic principles of transmission of images in substantially their natural color have been proposed. These have become commonly known as the sequential process and the simultaneous process.

The sequential process of transmission of the images in substantially their natural color transmits, over a single channel, information relating to a single selected component color representation at any one time. Other selected component colors follow in sequence. Although certain methods of sequential type transmission have been proposed involving extremely rapid changing from one selected component color to another, the sequential process inherently includes certain fundamental objections which are not present in the simultaneous type method of color transmission.

The simultaneous type method for the transmission of color information for a three-color system simultaneously transmits signals representative of the three different selected color components of the object being televised. In order to transfer a reasonable amount of detail, it is, of course, necessary to employ a relatively wide transmission band for the simultaneous type transmission, as compared with that necessary for black and white transmissions.

It is also necessary that the three independent simultaneous transmissions be received and reproduced with a substantially accurate degree of amplification which, of course, is influenced by signal fading or other energy transfer irregularities when transmission is employed by radio means.

According to this invention, a narrower frequency band is required for the transmission of images in substantially their natural color, and an improved result is obtained regarding the accurate magnitude relations of each of the transmitted selected component colors. Furthermore, the combined signal is suitable for direct use in black and white receivers.

According to this invention, a plurality of different selected color component signal trains are developed. Information is transmitted concerning the magnitude of one of the signal trains or all the signal trains combined in one, and information is also transmitted regarding the energy ratio between the signal trains.

A primary object of this invention is to provide for the improved transmission of images in substantially their natural color.

Other and incidental objects of the invention will be apparent to those skilled in the art from a reading of the following specification and an inspection of the accompanying drawing in which.

Figure 1:
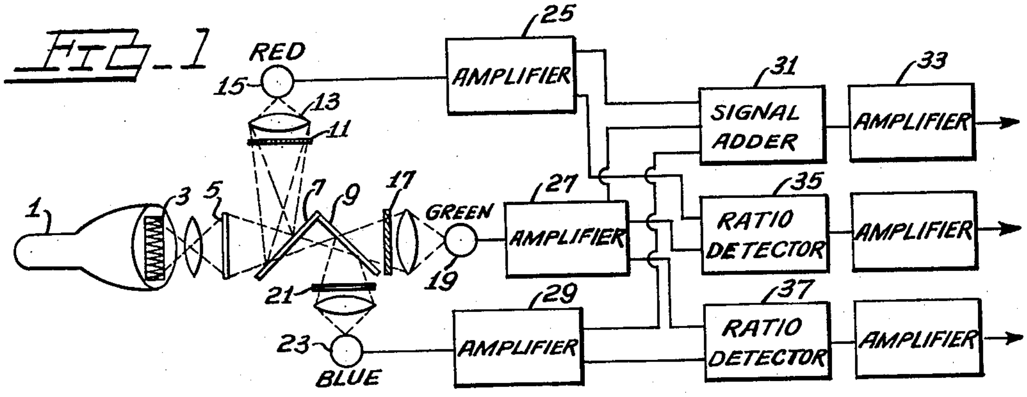
Figure 1 illustrates by block diagram one form of this invention.

Turning now in more detail to Figure 1, there is shown one form of color image pickup arrangement which involves a blank scanning raster producing tube 1 which may, for example, take the form of the popular kinescope. The tube 1 projects a scanning raster 3 on a color transparency or color film 5.

Light from the image 5 is directed to a half-silvered mirror arrangement including mirrors 7 and 9.

Mirrors 7 and 9 may either be of the well-known half-silvered type, which is partially reflective and partially transmissive to the light, or may, for example, take the form of the popular dichroic type of mirror arrangement which has color selective properties.

If mirror 7 is of the half-silvered type, a part of the light from image 5 will be reflected upward through a red filter 11 and through a lens 13 to a light responsive device 15. Because of the red filter 11, the light responsive device 15 will respond only to the red color component of the image on the film 5.

A portion of the light from image 5 will be transmitted directly through mirrors 7 and 9 to a green filter 17, which passes only the green color component of the image on film 5 to the light responsive device 19.

Likewise, a part of the light coming through mirror 7 will be reflected from mirror 9 downward through a blue filter 21, thus causing the blue color component of the image on film 5 to be directed upon a light sensitive device 23, which will furnish a signal train representative of the blue color component of the image on film 5.

An arrangement of this nature for the development of simultaneous type color video signals is well shown and described in an article entitled "Simultaneous All-Electronic Color Television," beginning on page 459 of the "RCA Review" for December 1946.

Although such an arrangement is shown in Figure 1 for dividing light, it is not intended that this invention be limited to the use thereof, but an arrangement such as shown and described in the U. S. Patent 2,560,351 granted July 10, 1951, to Ray D. Kell and George C. Sziklai, may be employed.

There has been suggested an arrangement for simultaneous pickup of several selected component color images by the use of three independent camera tubes, each having an associated component color filter. Such an arrangement is also suitable for employment in the operation of this invention.

The use of cross dichroic filters, as suggested in the co-pending U. S. application of Alfred C. Schroeder, Serial No. 731,647, filed February 28, 1947, entitled "Component Color Separator," is also a suitable arrangement.

Signals representative of the red color component of the image on film 5 are amplified in amplifier 25. Amplifier 27 is provided for the green color component signals, and amplifier 29 is likewise provided for the blue color component signals.

Figures 2, 3:
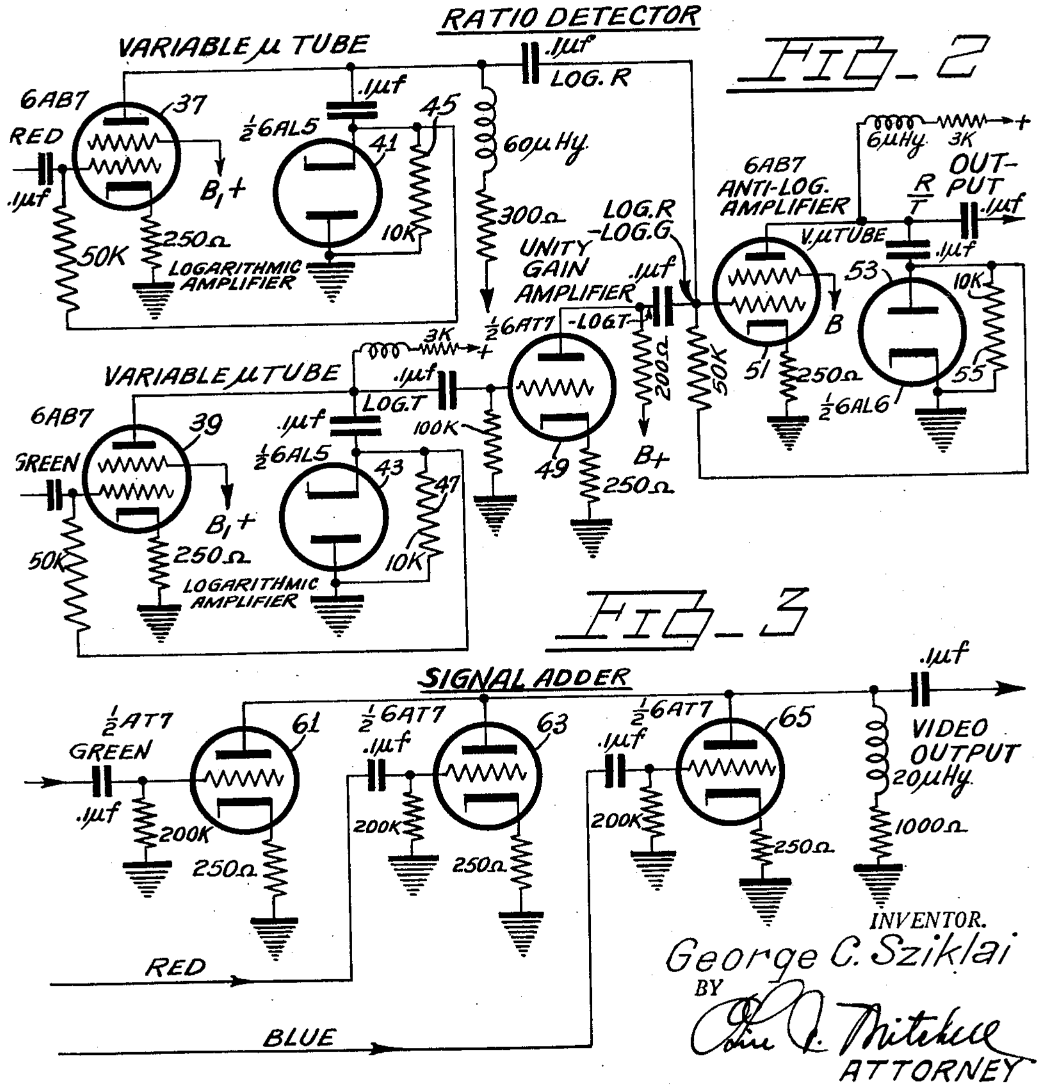
Figures 2 and 3 illustrate by circuit diagram details of suitable arrangements which may be employed in the form of the invention shown in Figure 1.

A signal adder 31, shown in block in Figure 1 and shown in detail in Figure 3, is connected to receive signals from amplifiers 25, 27 and 29 to combine or add the red, green and blue representative signals and transmit them to amplifier 33.

A ratio detector 35 is connected to receive and to determine the ratio between the red signals from amplifier 25 and the green signals from amplifier 27.

A second ratio detector 37 compares and determines a ratio between the green signals from amplifier 27 and the blue signals from amplifier 29.

In the form of the invention shown in Figure 1, a ratio is determined between the red and green signals, and a second ratio is determined between the green and the blue signals. In another form of this invention not shown in the drawing, a first ratio may be determined between the red signals and the sum of the signals, and a second ratio is determined between the blue signals and the sum of the signals.

Still other arrangements, such as the determination of the ratio between other combinations of selected color component signals, are suggested as still other forms of this invention.

Turning now to Figure 2, there is shown in detail a ratio detector which includes variable $\mu$ tubes 37 and 39.

The variable $\mu$ tubes 37 and 39 are of the type which produces a logarithmic amplification when employed in combination with diodes 41 and 43.

The logarithmic amplification will become apparent when it is seen that a portion of the output signal is returned to the control electrode of tubes 37 and 39 by employment of diodes 41 and 43 and associated resistors 45 and 47.

In a logarithmic amplifier, the output is proportional to the logarithm of the input signal. A logarithmic characteristic can be obtained by applying the voltage to be amplified to an amplifier consisting of one or several stages employing variable $\mu$ type tubes, such as tube 37. The output of the amplifier or, in the example shown, the output of tubes 37 and 39 is then rectified in diodes 41 and 43, respectively, and the resulting D.-C. current is used to provide what may be called an automatic volume control action that controls the amplification of the variable $\mu$ tubes 37 and 39 so that the output tends to be constant, with wide variations in input signal voltage.

The logarithmic amplifier including tube 39 is connected to a unity gain amplifier including tube 49.

The output signal of logarithmic amplifier including tube 37 is combined with the signal of unity gain amplifier 49 to furnish a signal at the control electrode of tube 51 equal to the logarithm of the red signal, less the logarithm of the green signal, for example.

The variable $\mu$ tube 51, which is employed as an anti-log. amplifier, is provided with a diode 53 and associated resistor 55 to produce anti-log. amplification in a manner similar to that obtained in tubes 37 and 39.

The ratio detector shown in Figure 2 is one form of suitable ratio detector. Another and perhaps simpler type of ratio detector is shown and described in my co-pending U. S. application entitled "Color Television System," Serial No. 788,747 filed November 28, 1947.

Turning now to Figure 3, there is shown one form of signal adder which is suitable for employment in block 31 of Figure 1. The tubes 61, 63 and 65 are connected to have a common parallel output with separate and individual inputs.

The green signal is applied to the control electrode of 61, the red signal is applied to the control electrode of tube 63, while the blue signal is applied to the control electrode of tube 65. It will be seen that the video output signal obtained from the plates of tubes 61, 63 and 65 will therefore be the sum of the green, red and blue signals.

Although suitable tube types, resistance, inductance and capacity values are indicated on the drawing, they are shown merely for purposes of example, and it is not intended that this invention should be limited to the use thereof. Any suitable values and tube types may be employed without departing from the spirit of this invention.

The form of the invention shown in Figure 1 shows the determination for a ratio signal train of the signal energy between the red and the green components, and for another ratio signal train, the ratio signal energy between the green and the blue components. In another form of the invention, the ratio signal trains may be formed by comparing the red and the green components to form one ratio signal train and comparing the red and the blue components to form another signal train. Likewise, in still another form, one ratio may be determined between the green and the blue, and another ratio between the red and the blue. In still another form, ratios may be determined between the red signal and the total signal derived from the signal adder 31, and the blue signal and the total signal derived from the signal adder 31.

The signal trains obtained from the practice of this invention may be transmitted or otherwise utilized for the reproduction of images in substantially their natural color at remote locations.

The information transmitted includes a signal train derived from the signal adder 31, which contains the sum of all the selected component color representative signal trains. At the receiving station, the signal intelligence is converted to image intelligence by the employment of the composite or added signal obtained from signal adder 31, together with the ratio signals, to form three separate and independent signal trains representative of the selected component colors of the image or object being televised.

The converted signals derived from the signals transmitted by the circuit illustrated in Figure 1 can be converted into the common type of simultaneous type color signals suitable for reproduction in any of the well-known manners, such as, for example, the television receiver shown and described in the "RCA Review" for December 1946.

The signals may also be utilized directly in a receiver employing the circuit arrangement shown and described in my co-pending U. S. application, Serial No. 788,747, filed November 28, 1947, which shows in its various forms methods and circuit arrangements for the reproduction of images from a plurality of signal trains including a combined signal, together with one or more ratio signals.

Although a flying spot arrangement is shown in Figure 1 for the generation of component color representative signal trains, other arrangements may be employed for converting color images into independent color representative signal trains, such as three separate mechanically associated component color cameras. Other image splitting arrangements may be used without departing from the spirit of this invention.

Having thus described the invention, what is claimed is:

1. A color television system comprising in combination means for developing a first video signal train representative of one selected color component of an object being televised, means for developing a second video signal train representative of a second color component of said object being televised, a signal ratio detector having an output circuit and a pair of input circuits, a connection between one of said input circuits and one of said means for developing video signal trains, a connection between the other input circuit and the other of said means for developing video signal trains, a signal utilization channel connected to one of said means for developing video signal trains, and another signal utilization channel connected to said output circuit of said signal ratio detector.

2. A color television system comprising means for developing a video signal train for each of a plurality of selected color components of an object being televised, a signal ratio detector having an output circuit and a pair of input circuits, a connection between one of said pair of input circuits and one of said means for developing video signal trains, a connection between the other one of the pair of input circuits and another of said means for developing video signal trains, an output signal channel connected to one of said means for developing video signal trains, and another output signal channel connected to said output circuit of said signal ratio detector.

3. A color television system comprising in combination means for developing a first video signal train representative of one selected color component of an object being televised, means for developing a second video signal train representative of a second color component of said object being televised, a signal adder for combining said video signal trains, a signal ratio detector having an output circuit and a pair of input circuits, a connection between one of said pair of input circuits and one of said means for developing video signal trains, a connection between the other one of the pair of input circuits and the other of said means for developing video signal trains, an output signal channel connected to said signal adder, and another output signal channel connected to said output circuit of said signal ratio detector.

4. A color television system comprising means for developing a video signal train for each of a plurality of selected color components of an object being televised, a signal adder for combining said video signal trains, a signal ratio detector having an output circuit and a pair of input circuits, a connection between one of said pair of input circuits and one of said means for developing video signal trains, a connection between the other one of the pair of input circuits and another of said means for developing video signal trains, an output signal channel connected to said signal adder, and another output signal channel connected to said output circuit of said signal ratio detector.

5. A color television system comprising in combination means for developing a first video signal train representative of one selected color component of an object being televised, means for developing a second video signal train representative of a second color component of said object being televised, means for developing a third video signal train representative of a third color component of said object being televised, a signal ratio detector having an output circuit and a pair of input circuits, a connection between one of said pair of input circuits and said means for developing a first video signal train, a connection between the other one of the pair of input circuits and said means for developing a second video signal train, a second signal ratio detector having an output circuit and a pair of input circuits, a connection between one of said pair of input circuits of said second signal ratio detector and said means for developing a first video signal train, a connection between the other one of the pair of input circuits of said second signal ratio detector and said means for developing a third video signal train, an output signal channel connected to said means for developing a first video signal train, and an output signal channel connected to said output circuit of each of said signal ratio detectors.

6. A color television system comprising in combination means for developing a first video signal train representative of one selected color component of an object being televised, means for developing a second video signal train representative of a second color component of said object being televised, means for developing a third video signal train representative of a third color component of said object being televised, a signal adder for combining said video signal trains, a connection between said signal adder and said means for developing video signal trains, a signal ratio detector having an output circuit and a pair of input circuits, a connection between one of said pair of input circuits and said means for developing a first video signal train, a connection between the other one of the pair of input circuits and said means for developing a second video signal train, a second signal ratio detector having an output circuit and a pair of input circuits, a connection between one of said pair of input circuits of said second signal ratio detector and said means for developing a first video signal train, a connection between the other one of the pair of input circuits of said second signal ratio detector and said means for developing a third video signal train, an output signal channel connected to said signal adder, and an output signal channel connected to said output circuit of each of said signal ratio detectors.

GEORGE C. SZIKLAI.

REFERENCES CITED

The following references are of record in the file of this patent:

UNITED STATES PATENTS

| Number | Name | Date |
| --- | --- | --- |
| 2,375,966 | Valensi | May 15, 1945 |
| 2,423,769 | Goldsmith | July 8, 1947 |

FOREIGN PATENTS

| Number | Country | Date |
| --- | --- | --- |
| 505,653 | Great Britain | May 11, 1939 |